US012617243B2

(12) United States Patent
Susanna et al.

(10) Patent No.: US 12,617,243 B2
(45) Date of Patent: May 5, 2026

(54) SELF-SEALING TYRE FOR VEHICLE WHEELS

(71) Applicant: Pirelli Tyre S.p.A., Milan (IT)

(72) Inventors: Antonio Susanna, Milan (IT); Raffaella Donetti, Milan (IT); Thomas Hanel, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 18/556,844

(22) PCT Filed: Apr. 29, 2022

(86) PCT No.: PCT/IB2022/053984
§ 371 (c)(1),
(2) Date: Oct. 23, 2023

(87) PCT Pub. No.: WO2022/229914
PCT Pub. Date: Nov. 3, 2022

(65) Prior Publication Data
US 2024/0208275 A1      Jun. 27, 2024

(30) Foreign Application Priority Data
Apr. 30, 2021      (IT) ........................ 102021000010973

(51) Int. Cl.
*B60C 19/12*      (2006.01)
(52) U.S. Cl.
CPC .................................. *B60C 19/122* (2013.01)
(58) Field of Classification Search
CPC .............................. B60C 19/12; B60C 19/122
See application file for complete search history.

(56) References Cited

U.S. PATENT DOCUMENTS

| | | | |
|---|---|---|---|
| 3,903,947 | A | 9/1975 | Emerson |
| 4,418,093 | A | 11/1983 | Gomberg et al. |

(Continued)

FOREIGN PATENT DOCUMENTS

| | | |
|---|---|---|
| CN | 106626992 B | 3/2019 |
| DE | 102008003554 A1 | 7/2009 |

(Continued)

OTHER PUBLICATIONS

International Search Report form the European Patent Office in corresponding International Application No. PCT/IB2022/053984 mailed Jul. 8, 2022.

(Continued)

*Primary Examiner* — Kendra Ly
(74) *Attorney, Agent, or Firm* — Finnegan, Henderson, Farabow, Garrett & Dunner, L.L.P.

(57)      ABSTRACT

The present invention relates to a self-sealing tyre for vehicle wheels comprising at least one carcass ply (3), a tread band (7) applied in a radially external position with respect to said carcass ply in a crown portion, at least one liner (9) applied in a radially internal position with respect to said carcass ply, a sealing assembly (10, 11) applied in a radially internal position with respect to said liner and axially extending at least at a part of the crown portion; wherein said sealing assembly comprises a permanent self-supporting elastomeric layer (11) having an elongation modulus at 10% lower than 0.8 MPa, said self-supporting elastomeric layer being obtained by vulcanisation of an elastomeric compound having a Mooney ML(1+4) viscosity lower than 30, and a layer of sealing material (10) associated with and supported by said permanent self-supporting elastomeric layer; wherein said self-supporting elastomeric layer is radially internal to the layer of sealing material and (Continued)

said layer of sealing material is placed substantially in contact with said liner.

18 Claims, 4 Drawing Sheets

(56) References Cited

U.S. PATENT DOCUMENTS

| | | | |
|---|---|---|---|
| 4,919,183 A | 4/1990 | Dobson | |
| 7,484,544 B2* | 2/2009 | Serra | B29C 73/22 |
| | | | 152/503 |
| 2007/0270538 A1* | 11/2007 | Somers | C08L 23/26 |
| | | | 524/496 |
| 2009/0084482 A1 | 4/2009 | Majumdar et al. | |
| 2009/0197995 A1* | 8/2009 | Tracey | C08K 5/01 |
| | | | 524/451 |
| 2009/0205765 A1* | 8/2009 | Sostmann | B29D 30/0685 |
| | | | 156/115 |
| 2010/0139829 A1* | 6/2010 | Frank | B60C 1/0008 |
| | | | 152/510 |
| 2012/0180923 A1 | 7/2012 | Custodero et al. | |
| 2012/0234449 A1 | 9/2012 | Greiveldinger et al. | |
| 2013/0263990 A1 | 10/2013 | Voge et al. | |
| 2016/0101657 A1 | 4/2016 | Majumdar et al. | |
| 2019/0092103 A1 | 3/2019 | Giannini et al. | |
| 2019/0291511 A1* | 9/2019 | Alexander | B60C 5/14 |

FOREIGN PATENT DOCUMENTS

| | | | | |
|---|---|---|---|---|
| DE | 102018201044 A1 | 7/2019 | | |
| EP | 1435301 A1 | 7/2004 | | |
| JP | 4194319 B2 | 12/2008 | | |
| WO | WO-2005017013 A1 * | 2/2005 | | B60C 1/00 |
| WO | 2011064698 A1 | 6/2011 | | |
| WO | 2017163219 A1 | 9/2017 | | |

OTHER PUBLICATIONS

Written Opinion of the International Searching Authority from the European Patent Office in corresponding International Application No. PCT/IB2022/053984 mailed Jul. 8, 2022.
Office Action issued by the Saudi Authority for Intellectual Property Office on Aug. 6, 2025, in corresponding Saudi Arabian Application No. 523451307 (2 pages).

* cited by examiner

SELF-SEALING TYRE FOR VEHICLE WHEELS

This application is a national stage entry application under 35 U.S.C. § 371 of International Application No. PCT/IB2022/053984, filed on Apr. 29, 2022, and claims priority to Italian Application No. 102021000010973, filed Apr. 30, 2021; the contents of each application is incorporated herein by reference in its entirety.

FIELD OF THE INVENTION

The present invention relates to a self-sealing tyre for vehicle wheels, optionally also comprising a noise reducing element. Self-sealing tyres for vehicle wheels are able to delay or prevent the loss of air and the consequent deflation due to a puncture caused by a sharp object such as a nail and/or screw.

BACKGROUND ART

A self-sealing tyre comprises at least one layer of sealing elastomeric material which can adhere to the sharp object that punctures the tyre. The sealing polymeric material is made so as to be dragged inside the hole when the sharp object is ejected or removed, thereby sealing the hole itself and preventing air escape from the tyre. The sealing material inside the finished tyre (moulded and vulcanised), even though it has a certain elasticity, is deformable and tacky.

In the manufacturing process of a self-sealing tyre, the sealing material may be deposited on the radially innermost wall of the already vulcanised tyre, as described for example in U.S. Pat. No. 4,418,093, or it may be applied during the assembly of the green and vulcanised tyre together with the other components. In the latter case, however, due to the tacky and scarcely rigid nature of the sealing material, handling and transport difficulties are encountered. To overcome these drawbacks, protective and support layers have been introduced, on which the sealing material is deposited in a uniform layer. Such layers, when arranged as radially innermost layer in the green tyre, facilitate the manufacture of the tyre, preventing any undesired contact of the material with itself, with the handling and assembly equipment and with the other components of the tyre, such as described for example in WO2011064698 in the name of the Applicant.

Furthermore, the aforesaid layers also perform a support function for the sealing material which, by its nature, is not very rigid, allowing it to be transported and handled on the plants. Therefore, said layers are also defined as self-supporting layers.

The self-supporting protective layer can be temporary and be removed after vulcanisation, as described for example in US2009/0084482, or permanent as it can remain in the final structure of the tyre, contributing to varying degrees to the sealing of the holes, as occurs for example in WO2011064698 in the name of the Applicant.

The self-supporting protective layers used in the industry for this purpose are of various nature and thickness.

US2009/0084482 discloses a removable protective layer of nylon or nylon and rubber compounds. The layer is generally removed after vulcanisation and is therefore no longer present in the finished tyre.

Document EP1435301 describes a self-sealing tyre obtained by arranging an elastomeric composition comprising poly-isobutylene and peroxides at an internal surface of a non-vulcanised tyre. In one embodiment, a protective layer of thermoplastic resin, consisting predominantly of nylon 11, is disposed on a side radially internal to the sealing layer. The thickness of the layer is 0.1 mm. The elastomeric composition is heated during the vulcanisation of the tyre, causing a decomposition reaction of the polyisobutylene and obtaining an elastomeric sealing layer.

Document US2012/0180923 relates to self-sealing tyres in which the sealing material layer is protected by a removable thermoplastic layer consisting of a block polymer, comprising hard blocks of polyamides and soft blocks of polyethers or copolymers of polyethers/polyesters (Pebax®). The protective layer prevents the sealing layer from sticking to the drum during assembly and subsequently to the vulcanisation membrane.

Document US2012/234449 describes a self-sealing tyre in which the permanent protective layer is based on a chlorinated thermoplastic polymer (PVC, PVDC) and high molecular weight plasticising agents.

Document WO2011064698 describes self-sealing tyres which allow selective sealing of holes with a diameter smaller than a predetermined value, achieved by virtue of a particular sealing assembly. Said assembly comprises a permanent protective layer in polyamide or polyester—arranged at least in the crown portion thereof so as to be radially more internal in the tyre—and a layer of sealing material, placed directly on the protective layer so as to result, in the tyre, in a radially outermost position with respect to the protective layer.

This sealing assembly has excellent performance, both in the initial sealing step at the time of perforation and when the sharp object is expelled, by virtue of the cooperation between the thin protective layer and the sealing material. The particular sealing assembly allows the sealing of the perforations in conditions of maximum safety, i.e. the selective sealing only of the holes which, being below a predetermined size, do not risk damaging the structures of the tyre.

SUMMARY OF THE INVENTION

Self-sealing tyres provided with a sealing assembly comprising a protective layer of polyamide or polyester, according to WO2011064698, are achieving considerable commercial success as they perform optimally the selective sealing function, guaranteeing the user a safe driving.

The Applicant has however observed that the protective layers based on polyamide or polyester make it more difficult to recycle the tyre at the end of its life and/or the semi-finished product comprising the sealing compound, since these layers are difficult to remove from the sealing compound.

The Applicant has therefore undertaken further studies aimed at further improving the safety of use of these tyres and their eco-sustainability.

The self-sealing tyre that we wanted to make, in addition to allowing easy recycling, should have offered a sealing capacity at least comparable if not improved compared to existing systems. Furthermore, in the manufacture of the green tyre, the sealing assembly should have been sufficiently self-supporting to allow the storage of the semi-finished product in reel as well as an easy unrolling from the reel itself, an easy transport of the web, it should have been joined in a simple and stable way, it should have be sufficiently deformable not to tear during the expansion step on the building drum and, at the end of this, not return elastically with such a force as to cause instability of the green material, and/or detachment of the sealing material from the protective layer or liner, and finally, it should also have had a thermal resistance such as not to be damaged during vulcanisation and moulding. Furthermore, the Applicant, being aware of the need to have tyres that in addition to being self-sealing are also less noisy, has undertaken studies for the production of self-sealing and soundproofed tyres and has found that the simple coupling of the self-sealing system, i.e. the sealing composition with the self-supporting layer, and of noise reducing elements made for example of foamed materials, did not achieve the desired results in terms of sealing.

In particular, the Applicant has implemented a tyre comprising a sealing system—consisting of a layer of sealing elastomeric composition, applied on the innermost surface thereof (i.e. on the internal surface of the liner) and of a self-supporting polyamide layer, according to WO2011064698, and a sound-absorbing polyurethane foam adhering to the layer. This tyre sometimes did not achieve the desired sealing performance. In fact, in the dynamic sealing test, it was observed that the conventional noise reducing element interfered with the closure of the perforations.

Without wishing to be bound to any interpretative theory, the Applicant believes that the breakage of the self-supporting polyamide layer caused by a puncture causes contact between the sealing material and the porous material of the noise reducing element which would prevent, or at least slow down, the flow of the sealing material towards the hole, aggravating the phenomenon of retention of the intrinsic sealing material of the polyamide. The Applicant also believes that the breakage of the self-supporting polyamide layer and of the porous material layer caused by the puncture generates fragments of polyamide and porous material which can interfere with the sealing of the hole by the sealing material, triggering the formation of micro-channels through which the pressurised air contained within the tyre can continue to escape. Despite the innumerable constraints imposed by the drawbacks encountered and the absence of teachings in the prior art, the Applicant has found that it was possible to produce a self-sealing tyre with a sealing assembly comprising a self-supporting elastomeric layer with a low elongation modulus, preferably with a 10% elongation modulus lower than 0.8 MPa, said self-supporting elastomeric layer being obtained by vulcanisation of an elastomeric compound having a low viscosity, preferably a Mooney ML(1+4) viscosity lower than 30, which unexpectedly showed an improved sealing capacity, which resulted in the possibility of reducing the quantities and thicknesses of the sealing material used in the tyre with the same sealing performance, with considerable savings.

Furthermore, the Applicant has found that the new self-sealing tyres do not have particular production problems such as the instability of the green semi-finished product, the weakness of the joint, the detachment of the sealing material.

Furthermore, the use of an elastomeric material for the self-supporting layer improves the recyclability of the semi-finished product and/or the tyre at the end of its life, with significant improvements in the industrial process and environmental protection.

Finally, the Applicant has found that the new self-sealing tyres allow the application of noise reducing elements avoiding to worsen the sealing properties. It is believed that the self-supporting elastomeric layer, by virtue of the high plasticity and extensibility due to the low elongation modulus, allows the sealing material to flow inside the hole once the sharp body has been extracted, and at the same time acts as a barrier to the entry of sealing material inside the sound-absorbing material, ensuring high sealing performance even in the presence of sound-absorbing materials.

The present self-sealing tyre therefore comprises a sealing assembly comprising a layer of sealing material in association with a permanent self-supporting elastomeric layer.

More specifically, according to a first aspect, the present invention relates to a self-sealing tyre for vehicle wheels comprising:

at least one carcass ply, a tread band applied in a radially external position with respect to said carcass ply in a crown portion.

at least one liner applied in a radially internal position with respect to said carcass ply, and a sealing assembly applied in a position radially internal with respect to the liner and extending axially at least at a portion of the crown portion;

wherein said sealing assembly comprises a permanent self-supporting elastomeric layer having an elongation modulus at 10% lower than 0.8 MPa, said self-supporting elastomeric layer being obtained by vulcanisation of an elastomeric compound having a Mooney ML(1+4) viscosity lower than 30, and a layer of sealing material associated with and supported by said permanent self-supporting elastomeric layer; wherein said self-supporting elastomeric layer is radially internal to the layer of sealing material and said layer of sealing material is placed substantially in contact with said liner.

The tensile features and the thickness of the self-supporting elastomeric layer, as well as the viscoelastic and tackiness features of the sealing material and its thickness are arranged in such a way that the assembly reacts to the exit of the perforating element with an effective sealing action in relation to the dimensions of the tyre and its intended use.

According to a second aspect, the present invention relates to a multilayered ribbon-like composite comprising a sealing assembly and a removable protective film, wherein said sealing assembly comprises a permanent self-supporting elastomeric layer having an elongation modulus at 10% lower than 0.8 MPa, said self-supporting elastomeric layer being obtained by vulcanisation of an elastomeric compound having a Mooney ML(1+4) viscosity lower than 30, and a layer of sealing material having a first and second main surface opposed thereto, said layer of sealing material being associated with and supported by said self-supporting elastomeric layer, at the level of the first surface, and wherein said removable protective film is placed in contact with the second surface of said sealing material.

BRIEF DESCRIPTION OF THE DRAWINGS

The accompanying drawings are provided for indicative and, thus, non-limiting purpose only.

DEFINITIONS

Figure 1:
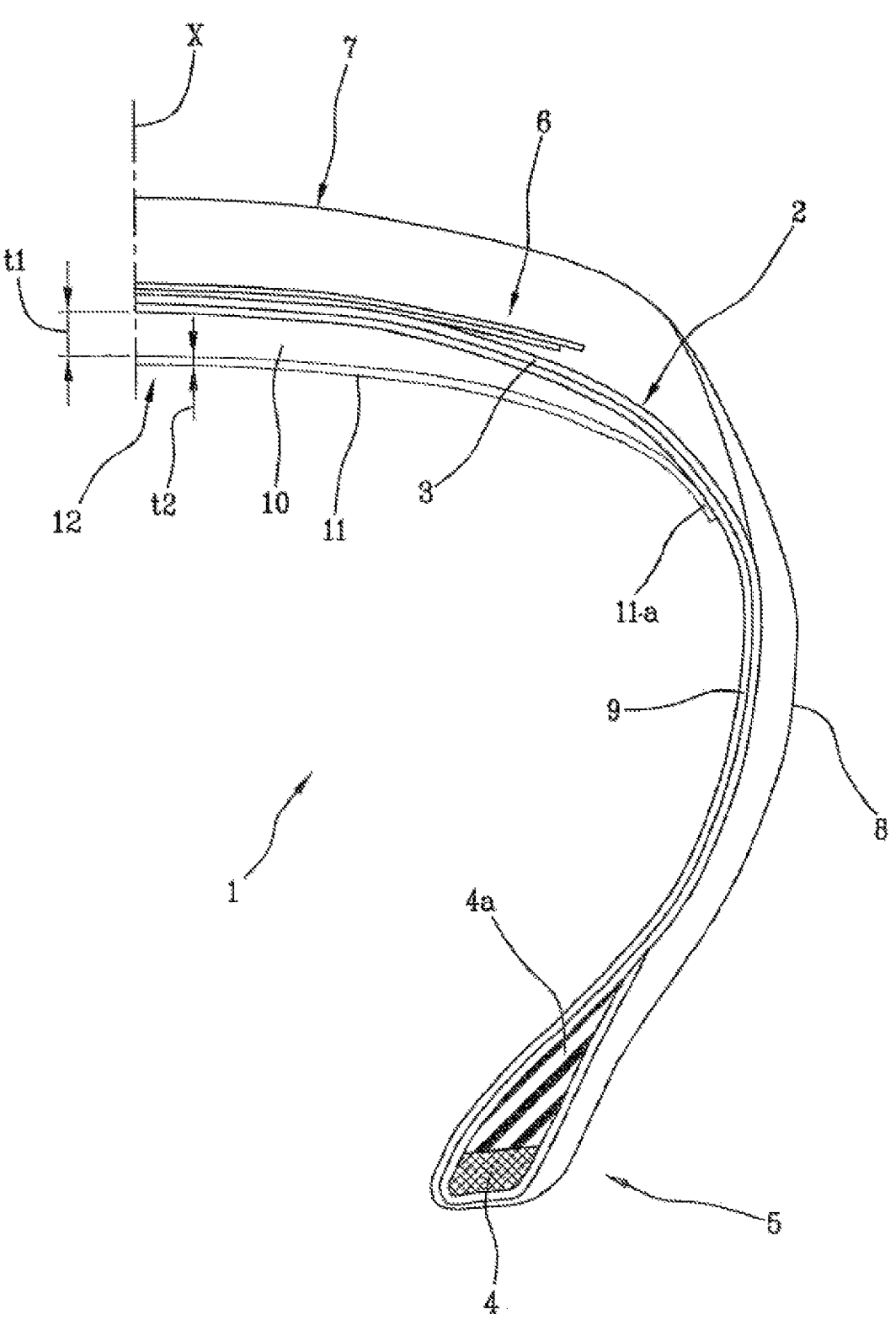
FIG. 1 schematically shows a radial half-section of a self-sealing tyre for vehicle wheels comprising a sealing assembly according to the present invention.

For the purposes of the present description and the following claims, the term "phr" (acronym for parts per hundreds of rubber) indicates the parts by weight of a given elastomeric compound component per 100 parts by weight of the elastomeric polymer, considered net of any extension oils.

The term "permanent self-supporting elastomeric layer" means an elastomeric layer capable of supporting the weight of the sealing material during the building of the tyre which remains in the final structure of the tyre after vulcanisation.

The term "elastomeric composition" means a composition comprising at least one diene elastomeric polymer and one or more additives, which by mixing and possible heating provides an elastomeric compound suitable for use in tyres and components thereof.

The components of the elastomeric composition are not generally introduced simultaneously into the mixer but typically added in sequence. In particular, the vulcanisation additives, such as the vulcanisation agent and possibly the accelerants and retardants, are usually added in a downstream step with respect to the incorporation and processing of all the other components.

In the final vulcanisable elastomeric compound, the individual components of the elastomeric composition may be altered or no longer individually traceable as modified, completely or in part, due to the interaction with the other components, of heat and/or mechanical processing. The term "elastomeric composition" herein is meant to include the set of all the components that are used in the preparation of the elastomeric compound, regardless of whether they are actually present simultaneously, are introduced sequentially or are then traceable in the elastomeric compound or in the final tyre.

The term "elastomeric polymer" indicates a natural or synthetic polymer which, after vulcanisation, may be stretched repeatedly at room temperature to at least twice its original length and after removal of the tensile load substantially immediately returns with force to approximately its original length (according to the definitions of the ASTM D1566-11 Standard terminology relating to Rubber).

The term "diene polymer" indicates a polymer or copolymer derived from the polymerisation of one or more different monomers, among which at least one of them is a conjugated diene (conjugated diolefin).

The term "elastomeric compound" indicates the compound obtainable by mixing and possibly heating at least one elastomeric polymer with at least one of the additives commonly used in the preparation of tyre compounds.

The term "expanded vulcanised elastomeric compound" means the material obtainable by vulcanisation of a vulcanisable elastomeric compound and expandable.

The term "green" indicates a material, a compound, a composition, a component or a tyre not yet vulcanised.

The term "vulcanisation" refers to the cross-linking reaction in a natural or synthetic rubber induced by a sulphur-based cross-linking agent.

The term "vulcanisation agent" indicates a product capable of transforming natural or synthetic rubber into elastic and resistant material due to the formation of a three-dimensional network of inter- and intra-molecular bonds. Typical vulcanisation agents are sulphur-based compounds such as elemental sulphur, polymeric sulphur, sulphur-donor agents such as bis[(trialkoxysilyl)propyl]polysulphides, thiurams, dithiodimorpholines and caprolactam-disulphide.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

The term "vulcanisation retardant" indicates a product capable of delaying the onset of the vulcanisation reaction and/or suppressing undesired secondary reactions, for example N-(cyclohexylthio)phthalimide (CTP).

The term "vulcanisation package" is meant to indicate the vulcanisation agent and one or more vulcanisation additives selected from among vulcanisation activating agents, accelerants and retardants.

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres and mixtures thereof.

DETAILED DESCRIPTION OF THE INVENTION

The self-sealing tyre of the present invention, in at least one of the above aspects thereof, can exhibit one or more of the following preferred features.

Advantageously, the sealing assembly is placed in the radially innermost position of the tyre to cover its entire circumferential extension for an axial (or transverse) extension of at least 60% of the crown portion of the tyre.

Preferably, the sealing assembly extends symmetrically from both sides of the equatorial plane of the tyre.

Preferably, such assembly extends axially for at least the entire crown portion of the tyre.

Alternatively, the sealing assembly extends beyond the crown portion, preferably in the area of the edges and sidewalls, up to the bead structures.

The "crown portion" of a tyre means the portion of the tyre structure corresponding to the region where the tread band is present. By way of example, the extension of the axial development of the crown portion can be identified by the distance between two segments perpendicular to the tread band starting from the edges of the tread band itself.

The self-supporting elastomeric layer of the sealing assembly according to the invention exhibits an elongation modulus of 10% lower than 0.8 MPa, preferably lower than 0.6 MPa, more preferably lower than 0.5 MPa.

The self-supporting elastomeric layer of the sealing assembly according to the invention exhibits an elongation modulus of 10% higher than 0.1 MPa, preferably higher than 0.2 MPa, more preferably higher than 0.3 MPa.

Advantageously, the self-supporting elastomeric layer of the sealing assembly according to the invention exhibits an elongation modulus of 10% equal to about 0.4 MPa.

The self-supporting elastomeric layer of the sealing assembly according to the invention is made with an elastomeric compound having a Mooney ML(1+4) viscosity lower than 30, preferably lower than 25.

The self-supporting elastomeric layer of the sealing assembly according to the invention is made with an elastomeric compound having a Mooney ML(1+4) viscosity higher than 10, preferably higher than 15.

Advantageously, the self-supporting elastomeric layer of the sealing assembly according to the invention is made with an elastomeric compound having a Mooney ML(1+4) viscosity of between 16 and 24, preferably between 17 and 23, advantageously equal to about 18, 19, 20, 21 or 22.

Mooney ML(1+4) viscosity at 100° C. was measured according to the ISO 289-1:1994 standard, on non-cross-linked elastomeric compositions. In the Mooney viscometer test, torque is measured. MI indicates the starting torque, while starting the analysis and ML indicates the final torque and is generally represented as ML(1+4)@100° C., which indicates the final torque @100° C. after 4 minutes of testing with 1 min of preheating.

Stress deformation: the static mechanical properties were measured according to ISO 37:2005, on O-rings made with cross-linked elastomeric compositions, measuring the force necessary to obtain an elongation of 10% (CA01).

The composition and thickness of the layer of sealing material and the thickness of the self-supporting elastomeric layer are selected, preferably within the aforementioned features, in relation to the type of tyre to be produced in order to provide the optimal viscoelastic features and tackiness for any conditions of use of the tyre itself.

In fact, the Applicant has taken care to apply the invention to tyres for four-wheeled vehicles for use on the road, such as tyres suitable for equipping medium and high-powered cars for transporting people (cord sizes from 195 mm to 245 mm) but without any prejudice, the invention is also suitable for tyres for small utility cars or high-performance tyres (HP high performances—UHP ultra high performances) with cord sizes for example from 145 mm to 355 mm. With the necessary adaptations, the present invention can be applied to tyres for different vehicles such as for example motorcycles.

Preferably, in the finished tyre, said self-supporting elastomeric layer has a thickness of less than 2 mm, preferably less than about 1.0 mm.

Preferably, in the finished tyre, said self-supporting elastomeric layer has a thickness greater than 0.1 mm, preferably greater than about 0.2 mm.

Advantageously, in the finished tyre, said self-supporting elastomeric layer has a thickness of between 0.3 mm and 0.9 mm, preferably between about 0.4 mm and about 0.7 mm, more preferably of 0.4 mm, 0.5 mm or 0.6 mm.

Preferably, in the finished tyre, said layer of sealing material has a thickness greater than about 2.0 mm and less than 6.0 mm.

Preferably, the layer of sealing material has a smaller axial extension than the axial development of the self-supporting elastomeric layer, so that the axially opposite edges of the self-supporting elastomeric layer guarantee lateral adhesion of the sealing assembly to the liner, so as to enclose and retain the sealing material laterally.

The axially opposite edges of the self-supporting elastomeric layer retain the sealing material during the tyre shaping and vulcanisation, when the pressure inside the mould presses the carcass against the internal walls of the mould itself.

The elastomeric compound of the self-supporting elastomeric layer according to the present invention comprises at least one natural or synthetic diene elastomeric polymer derived from the polymerisation of one or more monomers, among which at least one is a conjugated diene.

The synthetic diene elastomeric polymer may be obtained by solution polymerisation, emulsion polymerisation or gas phase polymerisation of at least one conjugated diene, optionally mixed with at least one comonomer selected from monovinylarenes and/or polar comonomers in an amount not exceeding 60% by weight.

The conjugated dienes generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, may be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer which may be used in the present invention may be selected, for example, from among: cis-1,4-polyisoprene (natural or synthetic, preferably natural rubber), 3,4-polyisoprene, polybutadiene (in particular polybutadiene with a high content of 1,4-cis), isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

The elastomeric compound of the self-supporting elastomeric layer according to the present invention preferably comprises at least one reinforcing filler selected from carbon black, conventional silica, such as sand silica precipitated with strong acids, preferably amorphous, diatomaceous earth, calcium carbonate, titanium dioxide, talc, alumina, aluminosilicates, kaolin, silicate fibres and mixtures thereof.

Preferably, the reinforcing filler is selected from carbon black, conventional silica, silicate fibres, talc and mixtures thereof.

The elastomeric composition for tyres of the invention may optionally comprise one or more reinforcing fillers as defined above in a mixture.

Commercial examples of reinforcing fillers suitable for use in the present elastomeric composition are the carbon black N326 and N375 from Cabot, the carbon black N326 and N375 from Birla, and Minstron HAR lamellar talc produced by Imerys Talc France.

The elastomeric compound of the self-supporting elastomeric layer according to the present invention can comprise at least one vulcanisation agent.

The vulcanisation agent is preferably selected from sulphur, or alternatively, sulphur-containing molecules (sulphur donors), in the presence of compounds containing zinc and fatty acids, or peroxides.

Preferably, the vulcanisation agent is sulphur preferably selected from soluble sulphur (crystalline sulphur), insoluble sulphur (polymeric sulphur), (iii) oil-dispersed sulphur and mixtures thereof.

Alternatively, sulphur donor molecules such as, for example, caprolactam disulphide (CLD), bis[(trialkoxysilyl) propyl]polysulphides, dithiophosphates, phosphoryl poly-sulphide (SDT) and mixtures thereof can be used.

Commercial examples of suitable vulcanisation agents are the 65% sulphur known under the trade name of Rhenogran from Lanxess, the 67% sulphur known under the trade name of Crystex OT33 from Eastman, the 95% sulphur known under the trade name of SchwefelKC from Solvay, the rhombic crystalline sulphur known under the trade name of Sulphur (1% oil and 0.3% silica) of Zolfindustria.

The vulcanisation agent may be present in the elastomeric composition of the invention in an overall amount generally of from 0.1 to 3 phr, preferably from 0.2 to 2 phr, even more preferably from 0.3 to 0.5 phr.

The vulcanisation agent is preferably used together with adjuvants such as vulcanisation activating agents, acceler-ants and/or retardants known to the man skilled in the art. The set of vulcanisation activating agents, accelerants and/or retardants constitutes, together with the vulcanisation agent, the so-called "vulcanisation package".

The vulcanisation activators which are particularly effec-tive are zinc compounds, and in particular ZnO, ZnCO$_3$, zinc salts of saturated or unsaturated fatty acids containing from 8 to 18 carbon atoms, such as, for example, zinc stearate, which are preferably formed in situ in the elastomeric composition from ZnO and fatty acid, as well as BiO, PbO, Pb$_3$O$_4$, PbO$_2$ or mixtures thereof. Commercial examples are Dispersing Agent FS-200 fatty acid zinc salts from Wuhan Jinghe, Palmera B1810 stearic acid from KLK OLEO or grade 203 zinc oxide from U.S. Zinc.

The vulcanisation accelerant is preferably selected from dithiocarbamates, guanidines, thioureas, thiazoles, sulphe-namides, sulphenimides, thiurams, amines, xanthates and mixtures thereof.

Preferably, the accelerant is selected from N-cyclohexyl-2-benzothiazol-sulphenamide (CBS), N-tert-butyl-2-benzo-thiazol-sulphenamide (TBBS) and mixtures thereof.

A commercial example of a suitable accelerant is N-cy-clohexyl-2-benzothiazol-sulphenamide Vulkacit® (CBS) marketed by Lanxess.

The vulcanisation accelerant may be present in the vul-canisable elastomeric composition in an overall amount generally ranging between 0.05 phr and 10 phr, preferably between 0.1 phr and 5 phr.

The vulcanisable elastomeric composition may comprise one or more vulcanisation accelerants as defined above in mixture.

The vulcanisation retardant may be selected for example from urea, phthalic anhydride, N-nitrosodiphenylamine N-cyclohexylthiophthalimide (CTP), and mixtures thereof.

A commercial example of a suitable retardant is N-cyclo-hexylthiophthalimide VULKALENT G from Lanxess.

The retardant may be present in the vulcanisable elasto-meric composition in an amount generally ranging between 0.05 phr and 2 phr.

The elastomeric compound of the self-supporting elasto-meric layer according to the present invention can comprise other additives commonly used in the production of elasto-meric compounds, such as for example antioxidant agents, anti-ageing agents, plasticisers, antiozonants (in particular of the p-phenylenediamine type), waxes, modified resins, lubricants, surfactants, or mixtures thereof.

The antioxidant agent may be selected from the group comprising phenylenediamine, diphenylamine, dihydroqui-noline, phenol, benzimidazole, hydroquinone and deriva-tives thereof, optionally in mixture.

The antioxidant agent is preferably selected from N-iso-propyl-N'-phenyl-p-phenylenediamine (IPPD), N-(1,3-dim-ethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenedi-amine, N,N'-diphenyl-p-phenylenediamine (DPPD), N,N'-ditolyl-p-phenylenediamine (DTPD), N,N'-di-beta-naph-thyl-p-phenylenediamine (DNPD), N, N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like and mixtures thereof, preferably it is N-(1,3-dimethyl-butyl)-N'-phenyl-p-phe-nylenediamine (6-PPD).

A commercial example of a suitable antioxidant agent is 6PPD from Solutia/Eastman and TMQ 2,2,4-trimethyl-1,2-dihydroquinoline-Vulkanox® HS/LG from Lanxess.

The antioxidant agent may be present in the vulcanisable elastomeric composition in an overall amount generally ranging between 0 phr and 20 phr, preferably between 0.5 phr and 10 phr.

In particular, in order to improve the processability of the compound, the compound may optionally be admixed with at least one plasticiser generally selected from mineral oils, vegetable oils, synthetic oils, polymers with a low molecular weight and mixtures thereof, such as, for example, aromatic oil, naphthenic oil, phthalates, soybean oil and mixtures thereof. Commercial examples of plasticising agents are NYTEX® 4700 naphthenic oil from Nynas, PM Oil paraf-finic oil from LLK International, Disflamol® TOF tris(2-ethylhexyl)phosphate from Lanxess, MES Catenex SNR mineral oil from Shell.

Furthermore, in order to improve the anti-adhesive prop-erties and decrease the tackiness of the self-supporting elastomeric layer and therefore reduce its interaction with the self-sealing material, at least one surfactant or a lubricant may be added to the compound, such as for example the amides of fatty acids marketed by Croda Italia SpA under the trade name of Crodamide™ or Incroslip™, such as for example Crodamide™ SR, Crodamide™ ER, Crodamide™ BR, Crodamide™ ORX, Crodamide™ S, Crodamide™ EBS, Crodamide™ OR, Crodamide™ SRV and Incroslip SL™, and by Fine Organics under the trade names of Finawax S, Finawax S 50, Finawax S 70, or a lubricant such as silicones or fluorinated polymers, such as PTFE.

For the purposes of the present invention, the composition of the sealing material is not particularly limiting: for example, the compositions described in document WO2009143895 or in document WO2013093608 in the name of the Applicant may be used.

By way of example, the sealing material may comprise
(a) at least one unsaturated styrenic thermoplastic elasto-mer;
(b) optionally at least one diene elastomer;
(c) at least one cross-linking agent;
(d) at least one tackifying agent.

The sealing polymeric material comprises, for example, from 20 phr to 100 phr, of at least one unsaturated styrenic thermoplastic elastomer, from 0 to 80 phr of at least one synthetic or natural diene elastomer, from 20 to 200 phr, preferably from 30 phr to 150 phr, of at least one tackifying agent, from 0.1 to 6 phr of at least one cross-linking agent, from 10 phr to 200 phr, preferably from 20 phr to 60 phr, of plasticiser (oil or liquid polymer), and preferably from 1 at 40 phr, preferably from 5 to 30 phr, of at least one reinforc-ing filler. According to a preferred embodiment, the sealing material may further comprise from about 1 phr to about 20 phr of at least one homogenising agent. In a further embodiment, the sealing material may further comprise from 0.05 phr to 5 phr of at least one peptizer agent.

According to a preferred embodiment, the unsaturated styrene thermoplastic elastomer is a styrene polymer selected from styrene/butadiene/styrene (SBS), styrene/isoprene/styrene (SIS), styrene/butadiene/isoprene/styrene (SBIS) block copolymers, and mixtures thereof, optionally also comprising the corresponding diblock thermoplastic elastomers, such as styrene-butadiene (SB) and styrene-isoprene (SI). Particularly preferred are the styrene/isoprene/styrene block copolymer or mixtures of one or more unsaturated styrenic thermoplastic elastomers containing at least 50% of styrene/isoprene/styrene block copolymer.

Preferably, the block copolymer has a styrene content of from about 10% to about 30%, more preferably from about 12% to about 18%.

Preferably, the block copolymer has a percentage of "diblock" of less than 70%, even more preferably less than 60%.

Preferably, the percentage of "diblock" is of between 15% and 55%.

By diblock percentage it is meant the percentage of block polymer consisting of only two segments: a polystyrenic one and an elastomeric one.

While such "diblocks" are present in the block polymers mainly consisting of three segments—styrene-elastomer-styrene and are considered as an impurity due to the imperfect efficiency of the "living polymerization", the Applicant believes that the presence of diblocks can be advantageously modulated in order to improve the quality of the sealing composition.

It is believed that a greater percentage of diblock corresponds to greater tackiness, but lower modulus and less cohesion of the sealing material.

Particularly preferred are styrene/isoprene/styrene block copolymers with a styrene content equal to or less than 20%, more preferably of between 14% and 20%.

These copolymers are for example marketed under the name Europrene® SOL T190, T9133 from Polimeri Europa, Vector® 4113, 4114 from Dexco Polymers, Kraton® D1111, D1112 and D1107J from Kraton.

According to a preferred embodiment, the synthetic or natural diene elastomer included in the sealing material may be selected from those commonly used among the elastomeric materials cross-linkable with sulphur or peroxides, which are particularly suitable for manufacturing tyres, i.e. from the elastomeric polymers or copolymers with an unsaturated chain having a glass transition temperature (Tg) generally below 20° C., preferably in the range from 0° C. to −110° C. These polymers or copolymers may be of natural origin or may be obtained by solution polymerisation, emulsion polymerisation or gas phase polymerisation of one or more conjugated diolefins, optionally mixed with at least one comonomer selected from monovinylarenes and/or polar comonomers in an amount not higher than 60% by weight. Conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-Butadiene or isoprene are particularly preferred.

Polar comonomers that may optionally be used can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile or mixtures thereof.

Preferably, the synthetic or natural diene elastomer included in the sealing material can be selected, for example, from: cis-1,4-polyisoprene (natural or synthetic rubber, preferably natural rubber), 3,4-polyisoprene, polybutadiene (in particular polybutadiene with a high content 1,4-cis), optionally halogenated isoprene/isobutene copolymers, 1,3-butadiene/acrylonitrile copolymers, styrene/1,3-butadiene copolymers (SBR), styrene/isoprene/1,3-butadiene copolymers, styrene/1,3-butadiene/acrylonitrile copolymers, or mixtures thereof.

The tackifying agents advantageously used in the present invention may be selected from the group of hydrocarbon resins having a number average molecular weight comprised between several hundreds and several thousands and which provides tackiness when the resin is mixed with natural or synthetic rubber.

Various types of synthetic resins may be used as resins. The above number average molecular weight (Mn) may be measured according to techniques known in the field, such as for example by gel permeation chromatography (GPC). In particular, hydrocarbon resins, phenolic-based resins, carbon-based resins, xylene-based resins and natural resins such as rosin-based resins or terpene-based resins may be used as tackifying agents.

Examples of commercial products of hydrocarbon resins include resins based on aromatic petroleum such as PET-COAL (manufactured by Tosoh Co., Ltd); resins based on C5/C9 hydrocarbons such as PETROTACK (manufactured by Tosoh Co); resins based on C5 hydrocarbons such as Escorez® 1102 (manufactured by Exxon Mobil).

Examples of phenol-based resin comprise resins with an alkylphenol-formaldehyde base and derived resins modified with rosin, resins with alkylphenol-acetylene base, modified alkylphenolic and terpene-phenol resins. Specific examples indicated by brand include commercial products such as RESINA SP-1068 (manufactured by SI GROUP Inc.) which is an octylphenol-formaldehyde resin, and KORESIN (manufactured by BASF Company) which is a p-t-butylphenol-acetylene resin.

Examples of carbon-based resins include coumarone-indene resins. Specific examples include commercial products, cited by brand, such as NOVARES C resins (manufactured by RUTGERS CHEMICAL GmbH), which are synthetic indene-coumarone resins (such as NOVARES C10, C30, and C70).

Examples of natural resins are rosin resins and terpene resins, which may be as such or modified: examples of these classes are the terpene resins DERCOLYTE manufactured by DRT, resins derived from rosin acids DERTOLINE, GRANOLITE and HYDROGRAL, manufactured by DRT.

Examples of xylene-based resins include xylene-formaldehyde resins.

The above tackifying agents may be used alone or mixed together.

Suitable cross-linking agents are sulphur or sulphur-containing molecules, in the presence of compounds containing zinc and fatty acids, or peroxides.

Examples of specific sulphur-containing molecules that can be used as crosslinking agents in the sealing materials for the manufacture of self-sealing tyres are elemental sulphur, thiurams, such as tetraisobutyl thiuram disulphide or tetrabenzyl thiuram disulphide, or dithiophosphates, such as zinc dibutyldithiophosphate, or dithiocarbamates, such as zinc dimethyl dithiocarbamate, together with ZnO or compounds containing zinc, fatty acids and sulphenamides, such as N-t-butyl-2-benzothiazyl sulphenamide (TBBS), or N-cyclohexyl-2-benzothiazyl sulphenamide (CBS), or thiazoles, such as 2,2'-dithiobis-(benzothiazole) (MBTS).

Specific examples of peroxides that can be used as crosslinking agents in the sealing materials for the manufacture of self-sealing tyres are organic peroxides such as dicumyl peroxide (DCP), 2,5-dimethyl-2,5-di(t-butyl-peroxy)hexane (DBPH), bis-(2,4-dichlorobenzoyl)peroxide (DCBP), di-t-butyl-peroxide.

Preferably, a peroxide is used as cross-linking agent, even more preferably 2,5-dimethyl-2,5-di(t-butyl-peroxy)hexane (DBPH).

A specific example of DBPH that can be used is a mixture of 45% DBPH with calcium carbonate and silica marketed under the name Luperox 101 XL45 from Arkema.

The amount of peroxide preferably ranges from about 0.1 phr to about 6 phr.

The presence of peroxide or sulphur or other crosslinking agent allows the partial chemical crosslinking of the sealing composition during the vulcanisation of the tyre so as to improve the dynamic sealing features of the layer of sealing material.

At least one reinforcing filler may be advantageously added to the above sealing elastomeric composition above, generally in an amount of from 0 phr to 120 phr, preferably from 10 phr to 50 phr. The reinforcing filler may be selected from those commonly used for cross-linked products, in particular for tyres, such as carbon black, silica, alumina, aluminosilicates, calcium carbonate, kaolin or mixtures thereof. Carbon black, silica and mixtures thereof are particularly preferred.

According to a preferred embodiment, said carbon black reinforcing filler can be selected from those having a surface area of not less than 20 $m^2/g$ (as determined by Statistical Thickness Surface Area—STSA—according to ISO 18852: 2005).

According to the second aspect of the present invention, the composite comprises a sealing assembly as previously described, and a removable protective film, which covers the surface of the sealing material opposite to the surface adhering to the self-supporting elastomeric layer. This protective film preserves the integrity of the sealing material and prevents the sealing assembly from adhering to itself, when wound on a reel, or to machine parts in the unrolling step. This protective film is then removed, generally before the cutting step, without damaging the integrity of the sealing material.

Generally the protective film has a thickness of less than 100 μm, preferably less than 50 μm.

Preferably, the protective film is wider than that of the self-supporting elastomeric layer and also that of the sealing material, more preferably it is wider than the total width of the semi-finished product.

Preferably the film comprises, more preferably it consists of, polymeric materials such as polyesters, polyamides, polycarbonate, polyvinyl chloride, generally made anti-adhesive with a layer of silicone or fluorinated polymer, or it is made of polytetrafluoroethylene, which does not require anti-adhesive treatments.

Preferably, the protective film is made of polyester, more preferably of silicone-coated polyester, i.e. of anti-adhesive polyester with a silicone treatment.

The self-sealing tyre according to the present invention preferably comprises a noise reducing element applied to the radially internal surface of the self-supporting elastomeric layer.

The expression "noise reducing element" means an element which, once associated with a radially inner surface of a tyre, has the ability to attenuate the noise produced by the cavity (cavity noise) delimited between the tyre and the rim on which it is mounted during use.

Said cavity noise is generated during the rolling of the tyre on the road, when the air present in the inner annular cavity is placed in vibration, as it is cyclically compressed in the tread crushing step, thus generating sound waves that are amplified by resonance. Cavity noise then propagates to the passenger compartment of the vehicle, by transmission through the rim, the hub, the suspension and the frame, and is perceived as very annoying by passengers.

The frequencies at which the air resonates in the cavity are inversely proportional to the tyre circumference, and depend, among other things, also on the shape of the cavity itself, on the nature and shape of the materials that internally line it. Indicatively, the resonant frequency can range from about 50 to 400 Hz, typically around 180-220 Hz for passenger car tyres, with a diameter from about 600 to 800 mm.

The ability to attenuate the cavity noise is usually imparted to said element by the type of material, or materials, of which said element is made and/or by the size of the same and/or by the number of elements inserted in the cavity. Such noise reducing elements usually consist of strips or blocks of porous material such as, for example, foamed polymeric material, which are effective in reducing the noise and are compatible with the use in the tyre.

During use, the noise reducing materials inserted in the inner cavity of tyres are subject to very significant mechanical and thermal stresses.

In fact, during rolling, on the one hand they are constantly stretched by deformation of the tyre and on the other hand, they are heated well above ambient temperature, due to the heat generated by the tread in the use on the road.

Therefore, for the specific application, the noise reducing materials in use generally exhibit good thermal and mechanical properties so as not to become degraded and/or deformed due to the combined action of heat and stress.

Furthermore, due to the fact that the air used to inflate the tyre may contain moisture, and that this moisture may condense and be absorbed by the porous material of the noise reducing element, resulting in a reduction in the noise attenuation capacity, the noise reducing materials in use generally have a low water absorption and are difficult to hydrolyse. Advantageously, the porous material of the noise reducing element can undergo a water-repellent treatment and/or an anti-mould treatment.

Preferably, the noise reducing materials are characterised by a water absorption, according to UNI EN 12088 (RH>95%—after 28 days) of less than 6 $Kg/m^2$ more preferably less than 4 $Kg/m^2$, even more preferably less than 3 $Kg/m^2$.

In addition, since noise reducing materials must easily deform during driving to avoid peeling phenomena and must not affect driving performance such as steering stability, such materials are preferably lightweight, low density and flexible materials. Preferably the noise reducing materials have a density not higher than 60 $Kg/m^3$, preferably not higher than 40 $Kg/m^3$, more preferably not higher than 35 $Kg/m^3$. Preferably the noise reducing materials have a density of not less than 5 $Kg/m^3$, more preferably not less than 10 $Kg/m^3$, the density of the noise reducing materials being measured according to the ISO 845:2009 standard.

The expanded polymeric materials preferably used to make the noise reducing element are foamed polyurethanes, such as for example ether-based polyurethane foam and ester-based polyurethane foam, foamed polyolefins, such as, for example, foamed polyethylene, foamed polypropylene, and mixtures thereof, and foamed rubbers, such as for example foamed chloroprene rubber (CR sponge), foamed ethylene-propylene rubber (EDPM sponge), foamed nitrile rubber (NBR sponge), and the like.

Expanded polymeric materials can be open cell or closed cell. The expanded polyolefin materials are preferably with closed cells, possibly perforated. The polyurethane materials are preferably with open cells. The cells can have variable sizes, generally divided into macrocells with an average size greater than 1.5 mm, and microcells with an average size smaller than 1.5 mm.

Useful examples of expanded polymeric materials are described in WO2013182477A1, EP2457748A1, EP1661735A1, EP1876038A1 and EP2457720A1, and furthermore in WO2016051371A1 and WO2017163219A1 in the name of the Applicant.

Further features and advantages will become more apparent from the detailed description of a preferred, but non-exclusive, embodiment of a self-sealing tyre for vehicle wheels and of a composite comprising a sealing assembly according to the present invention.

Such description is set out below with reference to the drawing of FIG. 1 provided for indicative and, therefore, non-limiting purposes only, where "X" indicates the equatorial plane of the finished tyre 1. For simplicity, FIG. 1 shows only a part of the tyre, the remaining part not shown being identical and arranged symmetrically with respect to the equatorial plane "X".

The reference numeral 1 indicates in FIG. 1 a self-sealing tyre for vehicle wheels, which generally comprises a carcass structure 2 comprising at least a carcass ply 3 having respectively opposite end flaps engaged with respective annular anchoring structures 4, optionally associated with elastomeric fillers 4a, integrated in the areas 5 usually identified by the name of "beads". The at least one carcass ply 3 comprises a plurality of textile or metal reinforcing cords arranged parallel to each other and at least partially covered with a layer of elastomeric material.

The carcass structure 2 is associated with a belt structure 6 comprising one or more belt layers placed in radial superposition with respect to one another and with respect to the carcass ply 3, having typically metal reinforcing cords.

Such reinforcing cords may have crossed orientation with respect to the circumferential development direction of tyre 1.

A tread band 7 is applied in a position radially outer to the belt structure 6, made of an elastomeric compound like other semi-finished products making up tyre 1. Respective sidewalls 8 of an elastomeric compound are further applied in axially outer position on the lateral surfaces of the carcass structure 2, each extending from one of the lateral edges of the tread band 7 up at the respective annular anchoring structure to beads 5.

Moreover, a radially inner surface of tyre 1 is preferably internally lined by a layer of substantially airtight elastomeric material, or so-called liner 9.

In the embodiment shown in FIG. 1, tyre 1 is of the type for motor vehicles.

Typically in this case, the belt structure 6 further comprises at least one radially outer layer comprising textile or metal cords or textile/metal combinations, arranged according to a substantially zero angle with respect to the circumferential development direction of the tyre.

According to embodiments of the present invention, the tyre 1 is for motor vehicles. The profile of the straight section of the tyre for motor vehicles (not shown) has a high transversal curvature since it must guarantee a sufficient footprint area in all the inclination conditions of the motor vehicle. The transverse curvature is defined by the value of the ratio between the distance f of the ridge of the tread from the line passing through the laterally opposite ends of the tread itself, measured on the equatorial plane of the tyre, and the width C defined by the distance between the laterally opposite ends of the tread itself. A tyre with high transverse curvature indicates a tyre whose transverse curvature ratio (f/C) is at least 0.20. Preferably, (f/C) is between 0.20 and 0.5 for a rear tyre and between 0.35 and 0.6 for a front tyre, respectively.

The self-sealing tyre 1 according to the invention further comprises a layer of sealing polymeric material 10 arranged at a crown portion of the tyre 1 and in a radially internal position with respect to the liner 9. The layer of sealing polymeric material 10 extends over the entire circumferential extension of the tyre 1. The layer of sealing material 10 preferably has a maximum thickness "t1" substantially at the equatorial plane "X" of the finished tyre 1, i.e. moulded and vulcanised, and tapers towards the axial ends of the crown portion (FIG. 1). Preferably, said maximum thickness "t1" is comprised between 2 mm and 6 mm, even more preferably between about 2.5 mm and 5 mm.

A self-supporting elastomeric layer 11 according to the present invention is arranged in a radially internal position with respect to the layer of sealing polymeric material 10 and in contact with said layer of sealing polymeric material 10. The self-supporting elastomeric layer 11 extends, like the layer of sealing polymeric material 10, for the entire circumferential extension of the tyre 1 and has a width, i.e. an axial extension, slightly greater than the axial extension of said layer 10.

Preferably, in the finished tyre, said self-supporting elastomeric layer 11 has a thickness "t2" preferably comprised between 0.1 mm and 2.0 mm, advantageously between about 0.2 mm and 1.0 mm.

The sealing polymeric material layer 10 and the self-supporting elastomeric layer 11 form a sealing assembly 12. The sealing assembly 12, when a sharp element (such as a nail or a screw) penetrates into the tyre and crosses the layer of sealing polymeric material 10 and the self-supporting elastomeric layer 11, is able to adhere to the object penetrated therein and can also flow into the hole when such an object is removed, thus sealing the hole itself and preventing the escape of air from the tyre.

The sealing assembly 12 is easily perforated by the sharp element while maintaining such deformability and tackiness as to contribute to the transfer of the sealing material while ejecting the sharp element. The perforations thus sealed are clearly visible on the surface of the sealing assembly 12, through the self-supporting elastomeric layer 11.

The axially opposite edges 11a of the self-supporting elastomeric layer 11 adhere to the radially internal surface of the liner 9 during the building of the green tyre 1, and cross-link with it during the vulcanisation process, fixing the sealing assembly 12 to the tyre, while containing the polymeric sealing material 10.

The building of a precursor of a green tyre 1 as described above, including the sealing assembly 12, is preferably carried out by assembling respective semi-finished products on one or more forming supports, not illustrated.

The carcass structure and the belt structure are generally made separately of each other in respective work stations, to be mutually assembled at a later time.

Figure 2:
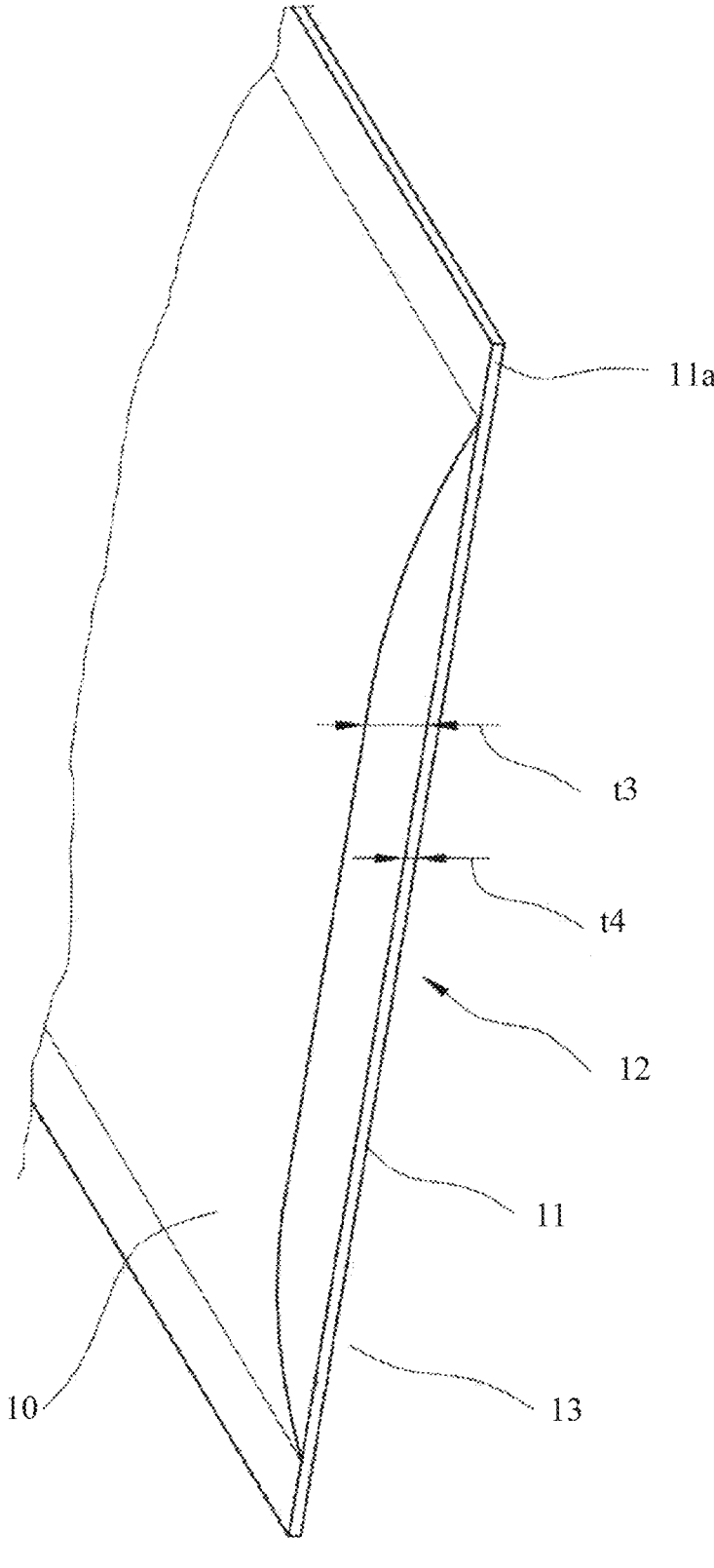
FIG. 2 shows a section of a sealing assembly intended to form part of the self-sealing tyre of FIG. 1.

More specifically, the building of the carcass structure first provides for the formation of the sealing assembly 12 as a continuous band comprising the layer of sealing material 10 arranged on and supported by the self-supporting elastomeric layer 11 with a width such as to leave exposed the axially opposite edges 11a of the self-supporting elastomeric layer 11 (FIG. 2).

The sealing layer 10, before incorporating the sealing assembly 12 into the precursor of the tyre 1 and its conformation, has a thickness "t3" between about 3 mm and about 8 mm.

The self-supporting elastomeric layer 11, before incorporating the sealing assembly 12 in the precursor of the tyre 1 and its conformation, has a thickness "t4" of less than 2 mm and preferably less than 1 mm.

The sealing assembly 12 is cut to size, preferably with an angled (bevel) cut and wrapped around a radially external surface of a building drum, keeping the self-supporting elastomeric layer 11 in a radially innermost position. Opposite end flaps of the sealing assembly 12 are mutually joined due to the adhesiveness of the sealing compound; preferably, the joint is covered (to avoid leakage of sealing material at the time of vulcanisation) and consolidated by means of, for example, an adhesive tape (joint).

The liner 9 and the carcass ply or plies 3 are applied on the sealing assembly 12 to form a so-called "carcass sleeve", typically substantially cylindrical. The annular anchoring structures 4 to beads 5 are fitted or formed on the opposite end flaps of the carcass ply or plies 3, which are then looped back around the annular structures 4 themselves so as to enclose them in a sort of loop.

A so-called "outer sleeve" is manufactured on a second drum or auxiliary drum, comprising the belt layers 6 applied in reciprocal mutual superimposition, and optionally the tread band 7 applied in a radially outer position to the belt layers 6. The outer sleeve is then picked up from the auxiliary drum to be coupled to the carcass sleeve. To this end, the outer sleeve is arranged coaxially around the carcass sleeve, after which the carcass ply or plies 3 is/are shaped according to a toroidal configuration by mutual axial approach of beads 5 and concurrent introduction of fluid under pressure into the carcass sleeve, so as to cause a radial expansion of the carcass plies 3 up to make them adhere against the inner surface of the outer sleeve.

The assembly of the carcass sleeve with the outer sleeve can be carried out on the same drum used to make the carcass sleeve, in which case it is called "single step building process" or "unistage process". Building processes of the so-called "two-step" type are also known, in which a so-called "first-step drum" is first used to make the carcass sleeve, while the assembly between the carcass sleeve and the outer sleeve is carried out on a so-called "second-step drum" or "shaping drum", on which the carcass sleeve picked up from the first-step drum and then, the outer sleeve picked up from the auxiliary drum are transferred.

After building of green tyre, a moulding and vulcanisation treatment is generally carried out in order to determine the structural stabilisation of the tyre through cross-linking of the elastomeric compounds, as well as to impart a desired tread pattern on the tread band 7 and to impart any distinguishing graphic signs at the sidewalls 8. A pattern of covalent bonds develops during vulcanisation between the elastomer macromolecules which, depending on its density, prevents flowing thereof, making the material more and more insoluble, non-melting and elastic. After vulcanisation, the layer of sealing material 10 achieves optimal deformability, tackiness and cohesion features.

During vulcanisation, despite the high temperatures used, the self-supporting elastomeric layer 11 and the sealing material 10 remain intact, do not damage the vulcanisation membrane and achieve optimal sealing performance.

Figure 3:
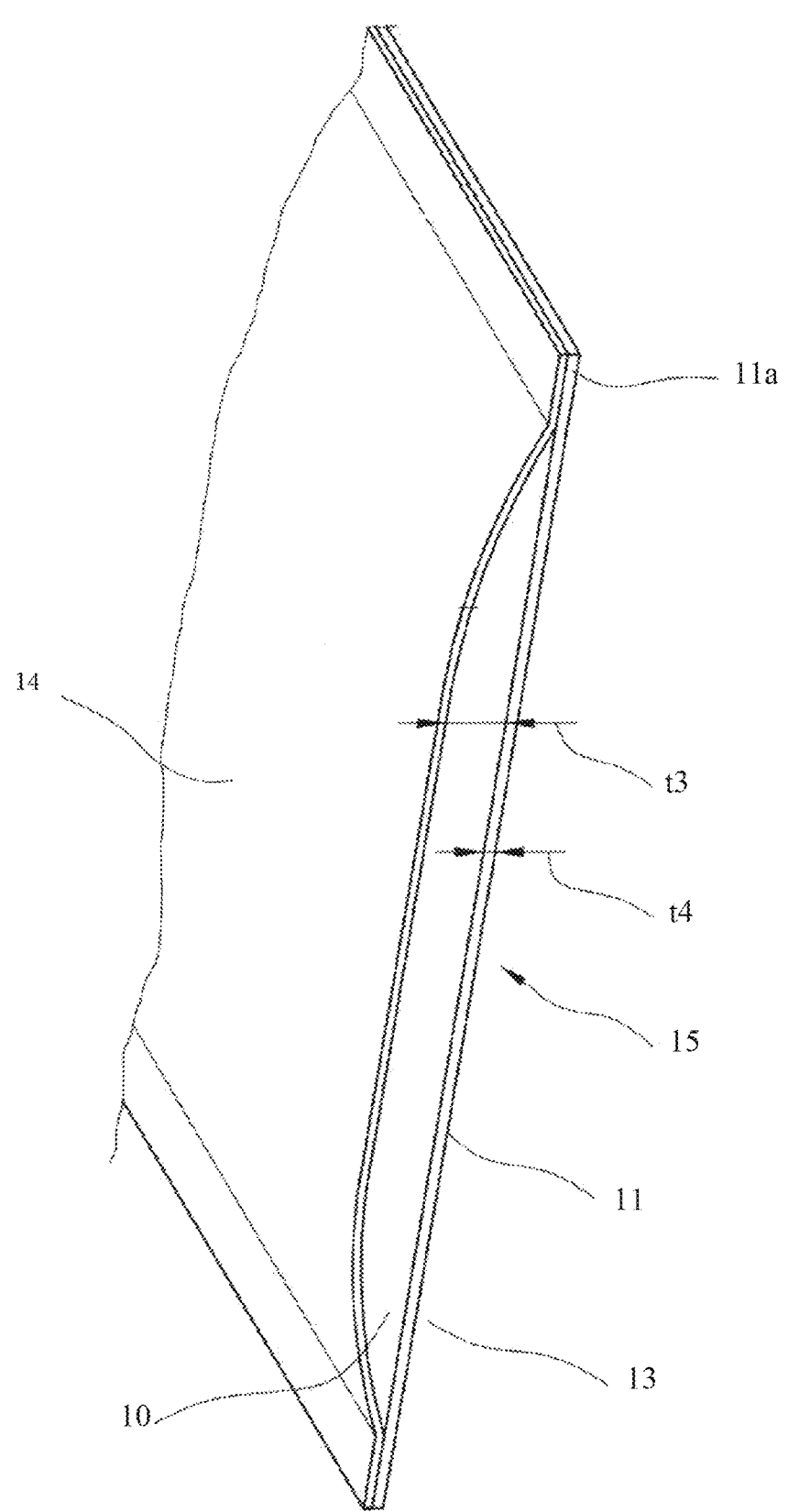
FIG. 3 is a sectional view of a multilayer sealing composite comprising the sealing assembly of FIG. 2 and a removable protective film.

In FIG. 3, the sealing assembly 10 of FIG. 2 is covered with a removable protective film 14 to give the multilayer composite 15. The multilayer composite 15 can be prepared, for example by extrusion of the sealing material 10 on the protective film 14 and mechanical coupling with the self-supporting elastomeric layer 11 to give the ribbon-like composite, which is cooled and generally stored wound on a reel.

Figure 4:
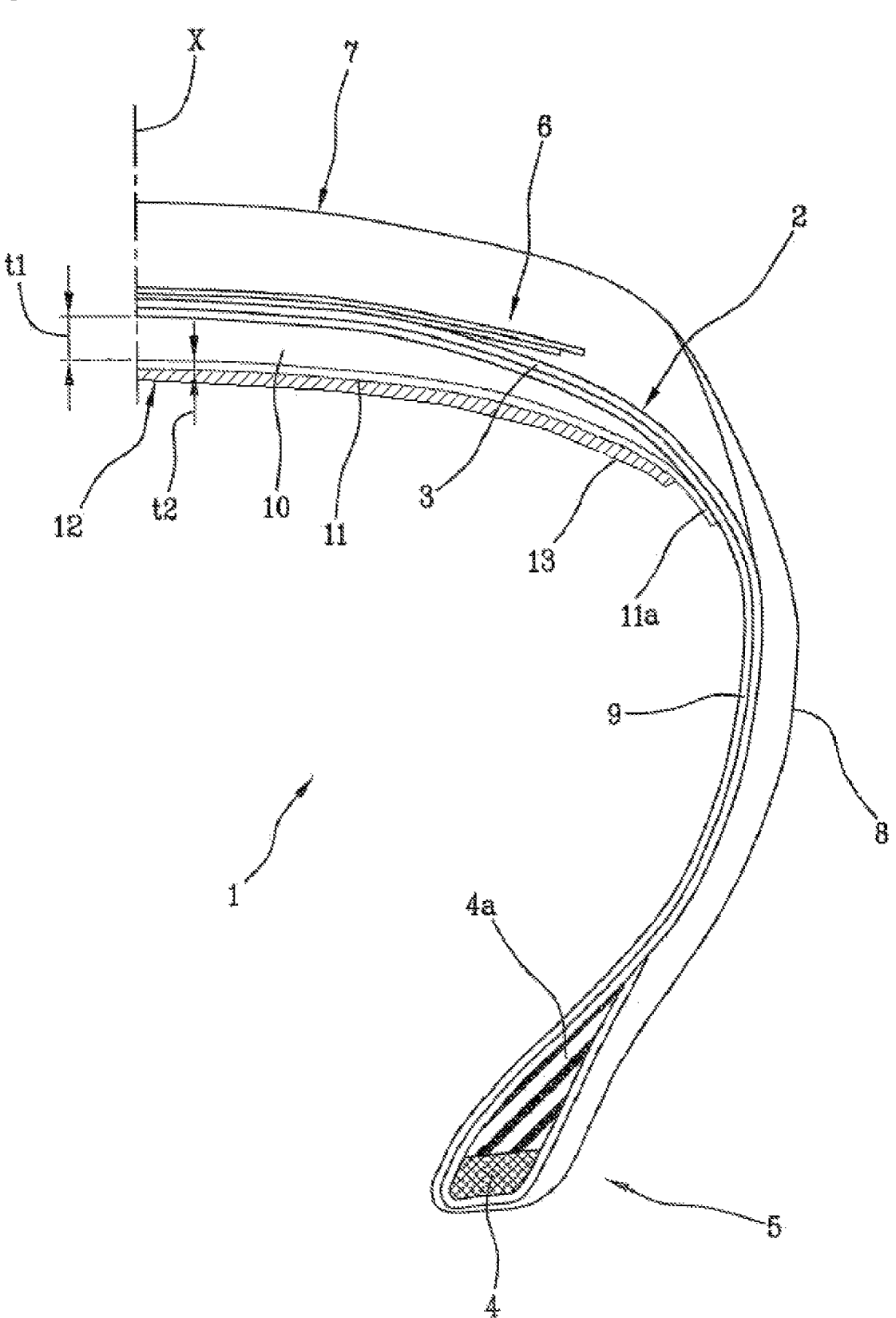
FIG. 4 schematically shows a radial half-section of a soundproof self-sealing tyre for vehicle wheels comprising a sealing assembly and a noise reducing element according to the present invention.

As shown in FIG. 4, the tyre 1 may finally comprise a layer of noise reducing material or element 13, made of expanded polymeric material, applied to the radially internal surface of the self-supporting layer 11, for example by gluing, for the entire circumference of the tyre and axially at at least 40% and up to 90% of the width of the tread band of the tyre, symmetrically with respect to the equatorial plane X. The noise reducing element or layer 13 can be made to adhere to the radially internal surface of the self-supporting layer 11, by gluing with suitable adhesives such as an acrylic adhesive, or by interlocking or compression, making the noise reducing layer larger than the internal diameter of the tyre.

The present invention will be further illustrated below by means of a number of preparatory examples, which are provided for indicative purposes only and without any limitation of the present invention.

EXAMPLES

For performing the tests, different types of tyres (size 215/55 R17) were made, including different sealing assemblies.

A sealing assembly 1 obtained according to the teaching of WO2011064698 and comprising a self-supporting layer of Filmon CXS18 polyamide of nominal 18 micron thickness was used as a reference.

A sealing assembly 2 comprising a self-supporting layer of 0.5 mm made of elastomeric material obtained with the composition of the following Table 1 was used as a comparison (Compound A).

TABLE 1

| Component | Quantity (phr) |
|---|---|
| BIIR | 100 |
| NC | 21 |
| Talc | 25 |
| Resin | 6 |
| Oil 1 | 3 |
| Oil 2 | 5 |
| ZnO | 3 |
| Stearic acid | 2 |
| Accelerant | 1.5 |
| Sulphur | 0.5 |

BIIR: bromoisobutyl rubber BIIR 2222 - Exxon;
NC: Carbon Black N234 from Cabot Corporation;
Talc: Minstron HAR produced by Imerys Talc France;
Resin: Struktol ® 40MS from Struktol Corporation;
Oil 1: Paraffin oil PM oil from LLK International
Oil 2: Tris(2-ethylhexyl)phosphate DISFLAMOLL TOF by Lanxess
ZnO: Standard Zn oxide from A-Esse;
Accelerant: Rhenogran MBTS 80 from Rheinchemie TABLE 1-continued

| Component | Quantity (phr) |
|---|---|
| Sulphur: Insoluble sulphur 67%, Sulphotechnics. | |

A sealing assembly 3 according to the present invention comprises a self-supporting layer of 0.5 mm or 0.4 mm made of elastomeric material obtained with the composition of the following Table 2 (Compound B).

TABLE 2

| Component | Quantity (phr) |
|---|---|
| NR | 100 |
| Talc | 30 |
| Surfactant | 10 |
| ZnO | 4 |
| Stearic acid | 2 |
| Antioxidant | 2 |
| Accelerant 1 | 1 |
| Accelerant 2 | 9 |
| Accelerant 3 | 2.5 |
| Sulphur | 0.3 |

NR: natural rubber (Standard Thai Rubber STR 20 - Thaiteck Rubber);
Talc: Minstron HAR produced by Imerys Talc France;
Surfactant: Crodamide ™ SR from Croda Italia SpA;
ZnO: Standard Zn oxide from A-Esse;
Antioxidant: Santoflex ® 6PPD from Eastman
Accelerant 1: Vulkacit ® CZ/EG-C from Lanxess
Accelerant 2: Duralink HTS from Eastman
Accelerant 3: Perkacit ® TBZTD from Eastman The mixing of the components was carried out in two steps using an internal mixer (Banbury, Intermix or Brabender)

In the first mixing step (1), all the ingredients were introduced with the exception of the vulcanisation agents and accelerants. The mixing was continued for a maximum time of 5 minutes, reaching a temperature of approximately 145° C. Subsequently, in the second mixing step (2), again carried out using an internal mixer, the vulcanisation agents and accelerants were added, and the mixing was continued for about 4 minutes while maintaining the temperature below 100° C. The compounds were then unloaded. After cooling and at least 12 hours from preparation, some samples of the compounds were vulcanised in a press at 170° C. for 10 min to give the specimens useful for characterisations.

The characterisation of the compounds was carried out through the evaluation of Mooney viscosity and strain deformation.

Mooney ML(1+4) viscosity at 100° C. was measured according to the ISO 289-1:1994 standard, on non-cross-linked elastomeric compositions.

Stress deformation: the static mechanical properties were measured according to ISO 37:2005, on O-rings made with the cross-linked elastomeric compositions, measuring the force necessary to obtain an elongation of 10% (CA01).

The results obtained are summarised in the following Table 3.

TABLE 3

| | Compound A (Comparison) | Compound B (Invention) |
|---|---|---|
| Mooney ML(1 + 4) viscosity | 55 | 19 |
| Stress strain (MPa) | 0.85 | 0.40 |

The sealing assemblies 1-3 comprised the sealing composition of the following Table 4.

TABLE 4

| Components | Quantity (phr) |
|---|---|
| IR | 50 |
| SBR | 30 |
| SIS | 20 |
| NC | 12 |
| Resin 1 | 40 |
| Resin 2 | 7 |
| Oil | 45 |
| Antioxidant | 2 |
| Peroxide | 0.6 |

IR: cis-1,4-polyisoprene from Nizhnekamskneftechim Export, Russia;
SBR: styrene-butadiene copolymer from International Specialty Products (ISP);
SIS: Europrene ® SOL T190 Styrene-Isoprene-Styrene block copolymer from Polimeri Europa;
NC: Carbon Black N234 from Cabot Corporation;
Peroxide: Luperox 101 XL45 from Arkema;
Oil: mineral oil (MES—Mild Extraction Solvated) Catenex SNR from Shell;
Resin 1: Escorez ® 1102 from ExxonMobil;
Resin 2: Struktol ® 40MS from Struktol Corporation;
Antioxidant: Santoflex ® 6PPD from Eastman.

The layer of sealing material before building the tyre had a thickness of about 4.0 mm and the sealing assembly was arranged in a radially internal position with respect to the liner (as illustrated in FIG. 1).

The sealing assemblies 1-3 were built and vulcanised with summer (Pirelli Cinturato P7™—P7), winter (Pirelli Winter Sottozero™ 3—WS3) and all-season (Pirelli Cinturato™ All Season Plus—ASP and Pirelli Scorpion™ Verde) tyres. All Season—ASV) with or without a noise reducing element consisting of 6 blocks with dimensions of 120×180×30 mm and 2 blocks with dimensions of 120×240×30 mm made of polyurethane material PL38LWF (Tekspan Automotive) with open microcells with density 35-41 Kg/m³ (ISO 845: 2009), and applied on the radially internal surface of the self-supporting layer.

The moulded and vulcanised tyres were mounted on a standard rim and inflated to a pressure of 2.4 bar.

The tyres were then subjected to a track test over a total distance of 47 km after being punctured with 12 sharp elements (nails or screws) having a diameter from 3 to 5 mm and a length of 50 mm at the crown portion. The arrangement of the sharp elements included dowels and grooves and was random.

The test was conducted at different temperatures depending on the type of tyre. The test with summer tyres was carried out at a temperature between 10° C. and 25° C. (hot test). The test with winter tyres was carried out at temperatures between −1° C. and −15° C. (cold test). The test with all-season tyres took place both hot and cold.

At the end of the test, the sharp elements were extracted and the degree of sealing was measured.

In the hot test, the extraction of the sharp elements was carried out with a tyre temperature above 15° C.

In the cold test, the extraction of the sharp elements was carried out with a tyre temperature between −5° C. and 5° C., after conditioning the tyres in a cold room at −25° C.

The degree of sealing was measured using the following equation:

$$\text{Sealing degree} = \left(100 - \frac{\sum_{n=1}^{n° \, punctures} \text{Evaluation}}{n° \, \text{punctures}} * 100\right)$$

where the evaluation is expressed by the operator for each puncture on a scale of five values from 1 (total loss) to 0 (no loss), with three intermediate levels 0.8, 0.5 and 0.2.

The results are summarised in the following Table 5, where for each test the result of the sealing degree is related to the test with the reference sealing assembly 1, which has been normalised to 100. Unless otherwise indicated, the thickness of the self-supporting layer of elastomeric material was 0.5 mm.

TABLE 5

| Test | Tyres | Sharp elements | Sealing assembly | Sound-absorbing element | Relative degree of sealing |
|------|-------|----------------|------------------|-------------------------|----------------------------|
| 1 hot | ASP | Nails | 1 (Ref) | Yes | 100 |
| | | | 3 (Inv) | Yes | 120 |
| 2 cold | WS3 | Nails | 1 (Ref) | Yes | 100 |
| | | | 3 (Inv) | Yes | 150 |
| 3 cold | ASP | Nails | 1 (Ref) | Yes | 100 |
| | | | 3 (Inv) | Yes | 138 |
| 4 hot | P7 | Nails | 1 (Ref) | No | 100 |
| | | | 2 (Comp) | No | 94 |
| | | | 1 (Ref) | Yes | 68 |
| 5 hot | ASV | Screws | 1 (Ref) | No | 100 |
| | | | 3 (*) (Inv) | No | 131 |

(Ref): Reference;
(Inv): Invention;
(Comp): Comparison;
(*): Thickness 0.4 mm
ASP: Pirelli Cinturato ™ All Season Plus
WS3: Pirelli Winter Sottozero ™ 3
P7: Pirelli Cinturato P7 ™
ASV: Pirelli Scorpion ™ Verde All Season The result of test 5 of Table 5 showed that the sealing assembly 3 according to the invention, comprising a self-supporting elastomeric layer having a thickness of 0.4 mm, leads to an improvement in the degree of sealing in direct comparison with the solution of the sealing assembly 1.

The results of tests 1-3 of Table 5 showed that the sealing assembly 3 according to the invention, comprising a self-supporting elastomeric layer having a thickness of 0.5 mm, leads to an improvement in the degree of sealing in direct comparison with the solution of the sealing assembly 1, even in the presence of the sound-absorbing material.

On the contrary, the result of test 4 of Table 5 showed that the comparative sealing assembly 2 shows a decay of the sealing performance, and that the addition of the sound-absorbing material causes a substantial decay of the sealing degree.

The invention claimed is:

1. A self-sealing tyre for vehicle wheels comprising:

at least one carcass ply, a tread band applied in a radially external position with respect to the carcass ply in a crown portion, at least one liner applied in a radially internal position with respect to the carcass ply, a sealing assembly applied in a radially internal position with respect to the liner and axially extending at least at a part of the crown portion;

wherein the sealing assembly comprises a permanent self-supporting elastomeric layer having an elongation modulus at 10% lower than 0.8 MPa, the self-supporting elastomeric layer comprises, before vulcanization, a vulcanisable elastomeric compound, comprising 100 phr of at least one natural or synthetic diene elastomeric polymer selected from the group consisting of natural or synthetic cis-1,4-polyisoprene, 3,4-polyisoprene, polybutadiene, non-halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof, and having a Mooney ML(1+4) viscosity lower than 30, when measured at 100° C., and a layer of sealing material associated with and supported by the permanent self-supporting elastomeric layer;

wherein the self-supporting elastomeric layer is radially internal to the layer of sealing material and the layer of sealing material is placed substantially in contact with the liner.

2. The tyre according to claim 1, wherein the self-supporting elastomeric layer has an elongation modulus at 10% lower than 0.6 MPa.

3. The tyre according to claim 1, wherein the self-supporting elastomeric layer has an elongation modulus at 10% higher than 0.2 MPa.

4. The tyre according to claim 1, wherein the compound has a Mooney ML(1+4) viscosity lower than 25, when measured at 100° C.

5. The tyre according to claim 1, wherein the compound has a Mooney ML(1+4) viscosity higher than 15, when measured at 100° C.

6. The tyre according to claim 1, wherein the self-supporting elastomeric layer has a thickness lower than 2 mm.

7. The tyre according to claim 1, wherein the self-supporting elastomeric layer has a thickness higher than 0.1 mm.

8. The tyre according to claim 1, wherein the layer of sealing material has a thickness higher than about 2.0 mm and lower than about 6.0 mm.

9. The tyre according to claim 1, wherein the sealing assembly axially extends for at least 60% of the crown portion of the tyre.

10. The tyre according to claim 9, wherein the sealing assembly axially extends for at least the entire crown portion of the tyre.

11. The tyre according to claim 1, wherein the self-supporting elastomeric layer has an elongation modulus at 10% lower than 0.5 MPa.

12. The tyre according to claim 1, wherein the self-supporting elastomeric layer has an elongation modulus at 10% higher than 0.3 MPa.

13. The tyre according to claim 1, wherein the self-supporting elastomeric layer has a thickness lower than 1 mm.

14. The tyre according to claim 1, wherein the self-supporting elastomeric layer has a thickness higher than 0.2 mm.

15. A multilayered ribbon-like composite comprising a sealing assembly, and a removable protective film, wherein the sealing assembly comprises a permanent self-supporting elastomeric layer having an elongation modulus at 10% lower than 0.8 MPa, the self-supporting elastomeric layer comprises, before vulcanization, a vulcanisable elastomeric compound comprising 100 phr of at least one natural or synthetic diene elastomeric polymer selected from the group consisting of natural or synthetic cis-1,4-polyisoprene, 3,4-polyisoprene, polybutadiene, non-halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof, and having a Mooney ML(1+4) viscosity lower than 30, when measured at 100° C., and a layer of sealing material having a first and a second opposite main surface,
wherein the layer of sealing material is associated with
and supported by the self-supporting elastomeric layer,
at the level of the first surface, and
wherein the removable protective film is placed in contact
with the second surface of the sealing material.

16. The composite according to claim 15, wherein the removable protective film has a thickness lower than 100 µm.

17. The composite according to claim 15 wherein the removable protective film comprises a polymeric material chosen from polyesters, polyamides, polycarbonates, polyvinyl chlorides, and fluorinated polyolefins.

18. The composite according to claim 15, wherein the removable protective film has a thickness lower than 50 µm.

\* \* \* \* \*